United States Patent
Fisher (10) Patent No.: US 10,544,352 B2
(45) Date of Patent: Jan. 28, 2020

(54) CONVEYANCE OF AMBIENT-REACTIVE SUBTERRANEAN FORMATION ADDITIVES TO DOWNHOLE LOCATIONS

(71) Applicant: Halliburton Energy Services, Inc., Houston, TX (US)

(72) Inventor: Chad Adam Fisher, Cache, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 174 days.

(21) Appl. No.: 15/761,071

(22) PCT Filed: Dec. 1, 2015

(86) PCT No.: PCT/US2015/063142
§ 371 (c)(1),
(2) Date: Mar. 16, 2018

(87) PCT Pub. No.: WO2017/095393
PCT Pub. Date: Jun. 8, 2017

(65) Prior Publication Data
US 2018/0273826 A1 Sep. 27, 2018

(51) Int. Cl.
*C09K 8/04* (2006.01)
*C09K 8/60* (2006.01)
(Continued)

(52) U.S. Cl.
CPC ............... *C09K 8/50* (2013.01); *C09K 8/03* (2013.01); *C09K 8/60* (2013.01); *C09K 8/602* (2013.01);
(Continued)

(58) Field of Classification Search
CPC .. C09K 8/60; C09K 8/04; C09K 8/602; E21B 36/008; E21B 21/01; E21B 21/062; E21B 21/068; E21B 2021/007
(Continued)

(56) References Cited

U.S. PATENT DOCUMENTS 5,083,613 A * 1/1992 Gregoli ................. B01F 3/0811
137/13
6,613,720 B1 9/2003 Feraud et al.
(Continued)

FOREIGN PATENT DOCUMENTS

WO WO-2015152919 A1 10/2015

OTHER PUBLICATIONS

Reddy et al., "Activator Development for Controlling Degradation Rates of Polymeric Diverting Agents," SPE-164117-PA, Feb. 2014, pp. 42-50.
(Continued)

*Primary Examiner* — Kenneth L Thompson
(74) *Attorney, Agent, or Firm* — McGuireWoods LLP (57) ABSTRACT

Methods including mixing a treatment fluid slurry in a storage tank, the treatment fluid slurry comprising an insulative base fluid, an ambient-reactive subterranean formation additive (ARA), wherein the ARA reacts at an ambient temperature, the reaction resulting in surface modification of the ARA, degradation of the ARA, or a combination of surface modification and degradation of the ARA, and wherein the insulative base fluid maintains the treatment fluid slurry at a temperature different from the ambient temperature to prevent the ARA from reacting; and introducing the treatment fluid slurry into a subterranean formation.

20 Claims, 3 Drawing Sheets

(51) Int. Cl.
- *C09K 8/50* (2006.01)
- *C09K 8/80* (2006.01)
- *E21B 43/26* (2006.01)
- *C09K 8/03* (2006.01)
- *E21B 47/10* (2012.01)
- *C09K 8/62* (2006.01)
- *E21B 33/138* (2006.01)
- *E21B 43/24* (2006.01)

(52) U.S. Cl.
CPC .................. *C09K 8/62* (2013.01); *C09K 8/80* (2013.01); *E21B 33/138* (2013.01); *E21B 43/24* (2013.01); *E21B 43/26* (2013.01); *E21B 47/1015* (2013.01); *C09K 2208/26* (2013.01); *C09K 2208/34* (2013.01)

(58) Field of Classification Search
USPC .......................................................... 166/300
See application file for complete search history.

(56) References Cited

U.S. PATENT DOCUMENTS

| | | | |
|---|---|---|---|
| 8,030,254 B2 * | 10/2011 | Phatak | C09K 8/685 |
| | | | 166/305.1 |
| 10,017,403 B2 * | 7/2018 | Keasler | E21B 43/00 |
| 10,240,081 B2 * | 3/2019 | Shchepelina | C09K 8/887 |
| 2007/0074869 A1 | 4/2007 | Svoboda | |
| 2008/0131395 A1 | 6/2008 | Wellinghoff et al. | |
| 2009/0029879 A1 * | 1/2009 | Soni | C09K 8/582 |
| | | | 507/201 |
| 2009/0050316 A1 * | 2/2009 | Fallon | B09C 1/00 |
| | | | 166/246 |
| 2013/0153229 A1 | 6/2013 | Abad et al. | |
| 2014/0338912 A1 | 11/2014 | Miller et al. | |
| 2019/0316026 A1 * | 10/2019 | Alvarado | C09K 8/588 |

OTHER PUBLICATIONS

International Search Report and Written Opinion from PCT/US2015/063142, dated Aug. 16, 2016, 14 pages.
Canadian Office Action dated Jan. 15, 2019; Canadian Patent Application No. CA 3,000,347.

* cited by examiner

CONVEYANCE OF AMBIENT-REACTIVE SUBTERRANEAN FORMATION ADDITIVES TO DOWNHOLE LOCATIONS

BACKGROUND

The embodiments herein relate generally to subterranean formation operations and, more particularly, to the conveyance of ambient-reactive subterranean formation additives to downhole locations.

Hydrocarbon producing wells (e.g., oil producing wells, gas producing wells, and the like) are created and stimulated using various treatment fluids introduced into a wellbore to perform a number of subterranean formation operations. The term "treatment fluid," as used herein, refers generally to any fluid that may be used in a subterranean application in conjunction with a desired function and/or for a desired purpose. The term "treatment fluid" does not imply any particular action by the fluid or any component thereof.

Hydrocarbon producing wells are first formed by drilling a wellbore into a subterranean formation, involving circulating a drilling treatment fluid as the wellbore is bored out using a drill bit. Primary cementing may then be performed using a cement slurry treatment fluid to enhance the structural integrity of the wellbore. Stimulation of hydrocarbon producing wells involves introducing a fracturing treatment fluid, sometimes called a carrier treatment fluid when particulates entrained therein. The fracturing treatment fluid is pumped into a portion of a subterranean formation (which may also be referred to herein simply as a "formation") above a fracture gradient sufficient to break down the formation and create one or more fractures therein. As used herein, the term "fracture gradient" refers to a pressure (e.g., flow rate) necessary to create or enhance at least one fracture in a subterranean formation.

Typically, particulate solids are suspended in a portion of one or more treatment fluids and then deposited into the fractures. The particulate solids, known as "proppant particulates" (or "propping agent" or simply "proppant") serve to prevent the fractures from fully closing once the hydraulic pressure is removed. By keeping the fractures from fully closing, the proppant particulates form a proppant pack having interstitial spaces that act as conductive paths through which fluids produced from the formation may flow. As used herein, the term "proppant pack" refers to a collection of proppant particulates in a fracture, thereby forming a "propped fracture."

BRIEF DESCRIPTION OF THE DRAWINGS

The following figures are included to illustrate certain aspects of the embodiments described herein, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The embodiments herein relate generally to subterranean formation operations and, more particularly, to the conveyance of ambient-reactive subterranean formation additives to downhole locations.

One or more subterranean formation additives are included in some or all of the treatment fluids used to prepare and recover hydrocarbons from a subterranean formation. As used herein, the term "subterranean formation additive" (or simply "formation additive") refers to a substance added to a treatment fluid to perform one or more specific functions, and does not imply any particular function. Such additives may serve a variety of purposes including, but not limiting to, lubricating and lowering torque and drag in the wellbore and to downhole equipment, ensuring uniform introduction over a treatment interval within the wellbore, preventing the formation and/or surface production of unconsolidated particulates, preventing loss of liquid portions of the treatment fluid(s) to the formation, suspending other particulate additives for delivery to a treatment interval, maintaining hydrostatic pressure within the wellbore, determining information about the wellbore or formation at a downhole location, maintaining the chemical integrity of the treatment fluid(s), and the like. Such additives may be used to enhance the particular subterranean formation operation treatment fluid into which they are included, as well as subsequent operations that may be performed.

Formation additives that are reactive at ambient surface temperatures are referred to herein as "ambient-reactive subterranean formation additives" (or "ambient-reactive formation additives" or "ARAs"). As used herein the term "ambient temperature" means the atmospheric temperature of an environment in which an ARA is to be present before being used within a subterranean formation, such as in a delivery truck, at the well-site, or a storage location. The term "well-site" refers to the physical location in which a wellbore is drilled and/or completed for the production of hydrocarbons, including injection wells that are drilled to enhance hydrocarbon recovery. Accordingly, the ambient temperature at a particular well-site may vary (e.g., may be relatively hot or relatively cold compared to room temperature, wherein room temperature is 20° C. to 25° C. For example, a well-site located in the Gulf of Mexico may experience higher temperatures than a well-site located in the North Sea. ARAs may, thus, be reactive at a range of ambient temperatures, and may be reactive at some well-site locations and not at others, depending on the ambient temperature of the particular well-site.

The reactivity of an ARA at ambient temperature at a well-site can result in a surface modification of the ARA, degradation of the ARA, or a combination of both surface modification and degradation of the ARA. Such surface modifications may result in a reduction in the efficacy of the ARA to perform its desired function, a completely inability of the ARA to effectively perform its desired function, interference with downhole equipment, interference with other subterranean formation additives, and the like, and any combination thereof. As an example, certain solid (i.e., non-liquid) diverting agents used in hydraulic fracturing operations are reactive at elevated (hot) ambient temperatures, wherein "hot" temperatures refers to temperatures starting at 30° C. and up to 60° C. As used herein, the term "diverting agent" refers to a chemical substance used to ensure uniform introduction of a treatment fluid(s) over a treatment interval in a formation, such as by creating a temporary blocking effect at certain areas (e.g., high permeability or porosity areas) in the formation. It will be appreciated that although the solid diverting agent is currently being described as reactive at hot ambient temperatures, certain types of solid diverting agents may be reactive at lower (cold) ambient temperatures and be introduced into a subterranean formation according to any of the embodiments described herein, without departing from the scope of the present disclosure. Hot and cold ambient temperatures according to the present disclosure are discussed in greater detail below.

The diverting agent ARAs that are reactive at hot ambient temperatures are designed to break down at certain temperatures to divert treatment fluid(s) to desired treatment zones, a byproduct of which is that the diverting agent ARAs become adhesive (i.e., able to stick to another surface or object) or cohesive (i.e., able to stick to itself or other like substances) at a downhole location within a formation to at least partially. The diverting agent ARAs function by creating a temporary blocking effect at a downhole location to prevent or reduce fluid from entering into that location compared to the same location without the diverting agent ARAs. The diverting agent ARAs that are reactive at hot ambient temperatures may further begin the process of degradation at the downhole location so that once treatment fluid(s) have been properly diverted, the degraded diverting agent ARAs may be removed from the formation with relative ease, such as by use of a flush fluid. Accordingly, well-sites having these hot ambient temperatures may result in the diverting agent ARAs reacting (i.e., becoming adhesive, cohesive, or degrading) prior to their placement at the desired downhole location to perform a diverting function. This reaction may take place as the diverting agent ARAs are in a slurry awaiting introduction into the subterranean formation or in the course of being transported and conveyed into a treatment fluid for later introduction into the subterranean formation, or both. Accordingly, the pre-reacted diverting agent ARAs are sub-optimal for use downhole as their reactions have already begun, or in some cases completed.

The embodiments of the present disclosure are directed at providing simple methods and systems of transferring, transporting, and metering (e.g. "introducing") ARAs into a treatment fluid and into a subterranean formation where refrigeration or heating of such ARAs is unavailable or economically unfeasible to maintain the ARAs in an unreacted form until they are delivered to a desired downhole location.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities or volumes of ingredients, properties such as temperature or concentration, and so forth used in the present specification and associated claims are to be understood as being modified in all instances by the term "about." As used herein, the term "about" encompasses +/−5% of a numerical value. Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

As used herein, the term "substantially" means largely, but not necessarily wholly.

The use of directional terms such as above, below, upper, lower, upward, downward, left, right, uphole, downhole and the like are used in relation to the illustrative embodiments as they are depicted in the figures herein, the upward direction being toward the top of the corresponding figure and the downward direction being toward the bottom of the corresponding figure, the uphole direction being toward the surface of the well and the downhole direction being toward the toe of the well. Additionally, the embodiments depicted in the figures herein are not necessarily to scale and certain features are shown in schematic form only or are exaggerated or minimized in scale in the interest of clarity.

In some embodiments, the present disclosure provides a method of mixing a treatment fluid slurry in a storage tank. As used herein, the term "slurry" with reference to a treatment fluid, previously defined herein, refers to a type of treatment fluid comprising a mixture of suspended solid(s) and liquid(s). As used herein, the term "storage tank" refers to any vessel capable of use at a well-site for formulating (i.e., mixing) or storing the treatment fluids slurries of the present disclosure. A storage tank may be mobile (e.g., a truck for delivery to a well-site) or otherwise permanent at a well-site, without departing from the scope of the present disclosure. The treatment fluid slurry comprises an insulative base fluid and an ARA. As used herein, the term "insulative base fluid" refers to an aqueous base fluid or an aqueous-miscible base fluid suitable for use in a subterranean formation capable of reducing or preventing temperature changes, and having a volumetric heat capacity greater than air. In some embodiments, the insulative base fluid preferably has a volumetric heat capacity of greater than about 1 joule per kelvin per milliliter (J/ml·K). The term "volumetric heat capacity," as used herein, refers to the ability of a given volume of a fluid (e.g., an insulative base fluid) to store internal energy while undergoing a given temperature change. As an example, and as discussed in greater detail below, fresh water has a thermal diffusivity on the magnitude of 100 times less than air, thus making it suitable as an insulative base fluids as defined herein because it can absorb a large amount of temperature energy (e.g., heat) without affecting its own temperature substantially.

The ARA in the treatment fluid slurry reacts at an ambient temperature, the reaction resulting in a surface modification of the ARA, degradation of the ARA, or a combination of both a surface modification and degradation of the ARA. As used herein, the term "surface modification" refers to any surface alteration of the ARA from a non-adhesive/cohesive and free-flowing form into an adhesive and/or cohesive form. As used herein, the term "degradation," and grammatical variants thereof (e.g., "degrade," "degrading," and the like), refers to the dissolution or chemical conversion of materials into smaller components, intermediates, or end products by at least one of solubilization, hydrolytic degradation, biologically formed entities (e.g., bacteria or enzymes), chemical reactions, electrochemical processes, thermal reactions, or reactions induced by radiation. Accordingly, the insulative base fluid comprising the ARA maintains the treatment fluid at a temperature that is different (above or below) the ambient temperature at which the ARA is reactive, thus preventing the ARA from experiencing the ambient temperature (e.g., the well-site temperature) and from prematurely reacting.

The treatment fluid slurry may be introduced into a subterranean formation either immediately upon its formation (i.e., the mixing of the treatment fluid slurry) or after some time of being held in the storage tank in which the treatment fluid was mixed. In other embodiments, the treatment fluid may be mixed off-site and transferred to the storage tank at a well-site, without departing from the scope of the present disclosure. In yet other embodiments, the treatment fluid may be mixed off-site in the storage tank and thereafter the storage tank transferred to the well-site, without departing from the scope of the present disclosure.

Figure 1:
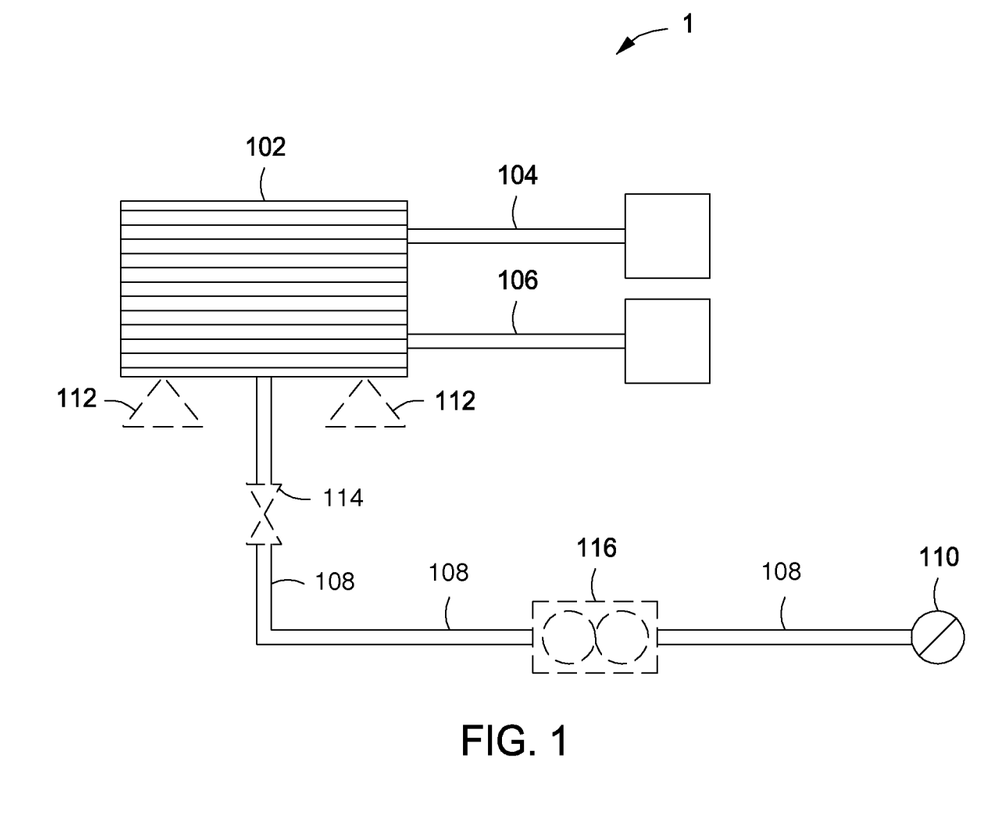
FIG. 1 is an illustrative schematic of a system for forming the treatment fluid slurries of the present disclosure for delivery to a downhole location, according to one or more embodiments described herein.

Accordingly, the embodiments herein encompass a system comprising various equipment for forming and delivering the treatment fluids slurries of the present disclosure to a downhole location, where the temperature of that downhole location triggers reaction of the ARA. Referring now to FIG. 1, illustrated is a schematic of a system 1 for forming the treatment fluid slurries of the present disclosure, according to one or more embodiments of the present disclosure. As depicted in FIG. 1, System 1 may include a storage tank 102, in which the treatment fluid slurries may of the embodiments herein may be formulated. For example, the insulative base fluid may be introduced into storage tank 102 from fluid tank and tubular combination 104, and the ARAs may be introduced into storage tank 102 from fluid tank and tubular combination 106, or vice versa. It will be appreciated that, although separate fluid tank and tubulars 104, 106 are shown for the insulative base fluid and the ARAs, respectively, in FIG. 1, a single fluid tank and tubular may be used to introduce the treatment fluid slurry in its entirety into storage tank 102, or the treatment fluid slurry may be introduced in its entirety directly into an open portion (e.g., a lid or hatch) of storage tank 102, without departing from the scope of the present disclosure. In some embodiments, the treatment fluid slurry comprising the insulative base fluid and ARAs may be introduced directly into an open portion of storage tank 102 or may be introduced through a single fluid tank and tubular, and additional supplemental materials may be introduced through a separate fluid tank and tubular, or directly into an open portion of storage tank 102, without departing from the scope of the present disclosure.

The storage tank 102 may further comprise a mixing tool or agitator to maintain the treatment fluid slurry in a turbulent state, for example, such that the ARAs or any supplemental material remains in suspension prior to introduction of the treatment fluid slurry to a downhole location. In some embodiments, the storage tank 102 may additionally be insulated to further provide temperature stability to the treatment fluid slurry (i.e., in addition to the stability provided by the insulative base fluid itself). The storage tank 102 may thus be hot insulated or cold insulated depending on the type of ARA in the storage tank 102 and the ambient temperature at the well-site. The storage tank 102 may be insulated by any means known in the art, such as by jacketing, running cool or hot coils (e.g., electric, or having fluid or air flowing therein), and the like, without departing from the scope of the present disclosure. For example, in one embodiment, the storage tank 102 is kept above an ambient temperature by using a heating element at one or more locations about the storage tank 102, such as at the base, around the circumference one or more times, or at the top of the storage tank 102. The heating element may be circulated hot liquid or gas, electric heating coils, an electromagnetic radiation source, and the like. In another embodiment, the storage tank 102 is kept below an ambient temperature by using a cooling element at one or more locations about the storage tank 102, such as at the base, around the circumference one or more times, or at the top of the storage tank 102. The cooling element may be circulated cool or cold liquid or gas, electric cooling coils, an air source (e.g., a fan or air conditioner), and the like.

A tank conveyance tubular 108 fluidically couples the storage tank 102 and a pump 110 downstream of the storage tank 102 and the tank conveyance tubular 108. As used herein, the term "fluidically couples," and grammatical variants thereof, refers to a coupling between two components (e.g., equipment pieces, such as a tank and a pump) through which fluid (i.e., liquid or gas) can flow at least in one direction when the flow path is not restricted.

The pump 110 may be a high pressure pump in some embodiments. As used herein, the term "high pressure pump" will refer to a pump that is capable of delivering a treatment fluid slurry downhole at a pressure of 1000 psi or greater. A high pressure pump may be used when it is desired to introduce the treatment fluid slurry to a subterranean formation at or above a fracture gradient of the subterranean formation, but it may also be used in cases where fracturing is not desired. The high pressure pump may be capable of fluidly conveying solid particulate matter in the treatment fluid slurry (e.g., the ARAs or other supplemental materials. Suitable high pressure pumps will be known to one having ordinary skill in the art and may include, but are not limited to, floating piston pumps and positive displacement pumps.

In other embodiments, the pump 110 may be a low pressure pump. As used herein, the term "low pressure pump" will refer to a pump that operates at a pressure of 1000 psi or less. In some embodiments, a low pressure pump may be fluidly coupled to a high pressure pump that is fluidly coupled to the tank conveyance tubular 108. That is, in such embodiments, the low pressure pump may be configured to convey the treatment fluid slurry to the high pressure pump. In such embodiments, the low pressure pump may "step up" the pressure of the fluid before it reaches the high pressure pump.

Figure 3:
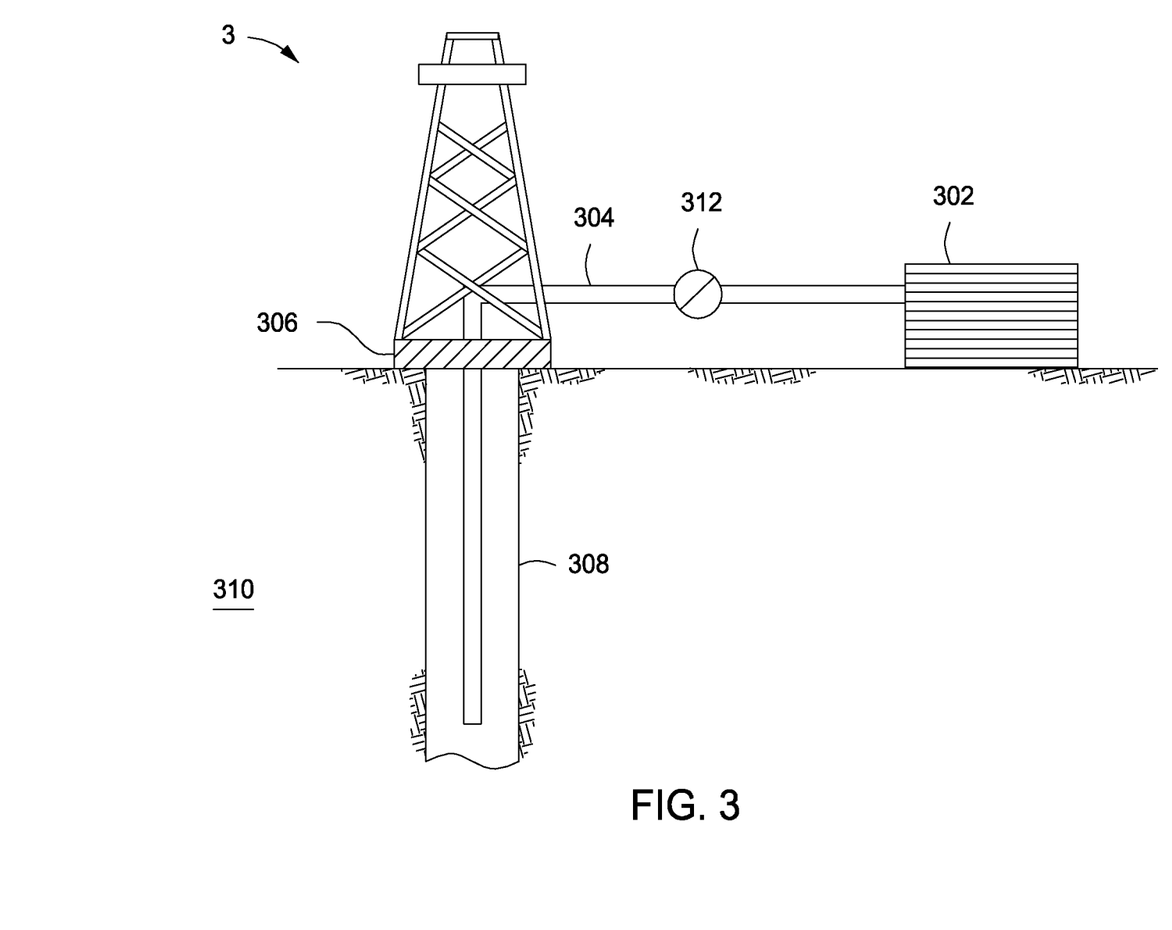
FIG. 3 is an illustrative schematic of a system for delivering the treatment fluids slurries of the present disclosure to a downhole location, according to one or more embodiments described herein.

In some embodiments, the system 1 may further comprise one or more load cells 112 (shown in phantom) that can calculate, determine, and monitor the rate at which the treatment fluid slurry is entering the tank conveyance tubular 108 for eventual delivery into the subterranean formation (see FIG. 3). As used herein, the term "load cell" refers to any device capable of determining and monitoring the weight of a treatment fluid slurry and the storage tank (e.g., storage tank 102) in which it is included. Accordingly, the fluid rate of the treatment fluid can be determined based on the decrease in weight over time, and the fluid rate of individual components of the treatment fluid slurry can be determined based on the ratio of individual components (e.g., the ARA) in the treatment fluid slurry, as well. As depicted, two load cells 112 are shown in FIG. 1, however, it will be appreciated that one or more than two load cells may be used to determine and monitor flow rate of the treatment fluid slurry from the storage tank 102 and into the tank conveyance tubular 108, without departing from the scope of the present disclosure. In any embodiments, a valve 114 (shown in phantom) may further be fluidically coupled to the tank conveyance tubular 108 downstream from the storage tank 102 and upstream of the pump 110. The valve 114 can be used to reduce or shut off fluid flow of the treatment fluid slurry from the storage tank 102 and into the tank conveyance tubular 108, which may be monitored using the load cells 112.

In any embodiments (e.g., with or without load cell(s) 104), a flowmeter 116 (shown in phantom) may additionally be included in system 1. A "flowmeter," as used herein, measures a volume of the treatment fluid slurry as it flows through the tank conveyance tubular 108. An operator may then adjust the valve 114 to control the volume of treatment fluid slurry or may adjust the pump 110 to control the volume of treatment fluid slurry. Additionally, a valve, similar or the same as valve 114, may be located between the flowmeter 116 and the pump 110 to control the volume of treatment fluid slurry, without departing from the scope of the present disclosure. Moreover, any combination of the valve 114, any other valves located along the tank conveyance tubular 108, the pump 110, and any other high pressure or low pressure pumps may be used to control the flow rate and/or volume of the treatment fluid slurry in the tank conveyance tubular 108 for eventual introduction into a subterranean formation (see FIG. 3).

Where the treatment fluid slurries of the present disclosure are introduced directly from the storage tank 102 (e.g., from the location in which they are mixed), the treatment fluid slurries may be undiluted when introduced into the subterranean formation. That is, they are not further diluted after exiting the storage tank 102 and prior to their introduction into the subterranean formation. In such instances, the treatment fluid slurries maybe introduced as a pill or as a slug. As used herein, the term "pill" refers to a relatively small quantity of the treatment fluid slurry used to accomplish a specific subterranean formation operation. The small quantity is generally less than about 8 kiloliters (equivalent to about 50 barrels). As used herein, the term "slug" refers to a small volume of the treatment fluid slurry relative to the overall fluid currently circulating or contained within the wellbore that functions to cause a change in the overall fluid. For example, the slug may be denser than the overall fluid to cause the overall fluid to increase in density. For example, a slug may be used to divert fluid flow of the treatment fluid slurry from one area in the wellbore or formation to another.

Figure 2:
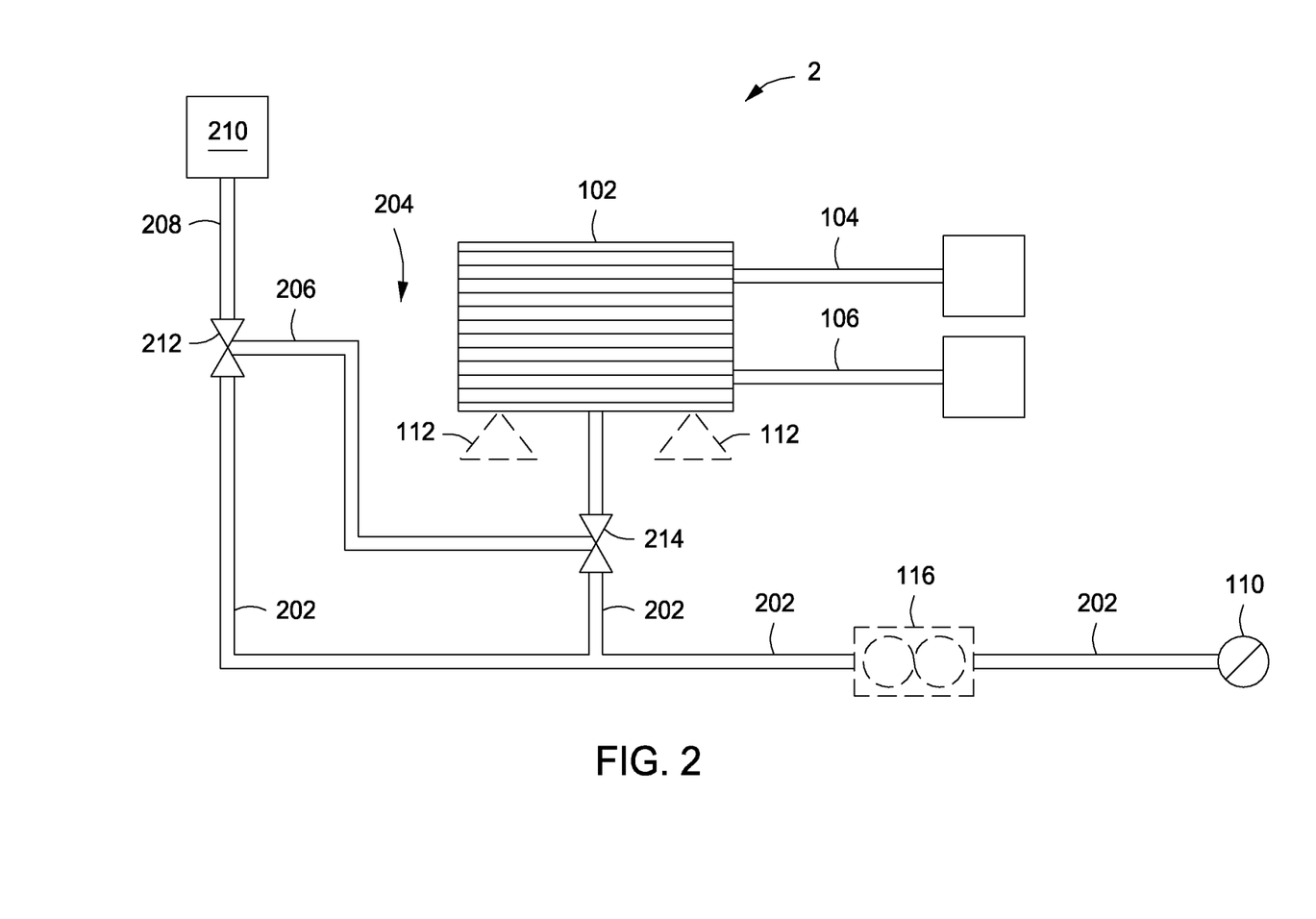
FIG. 2 is an illustrative schematic of a system for forming the treatment fluid slurries of the present disclosure for delivery to a downhole location, according to one or more embodiments described herein.

Referring now to FIG. 2, with continued reference to FIG. 1, illustrated is another schematic of a system 2 for forming the treatment fluid slurries of the present disclosure using sequence control, according to one or more embodiments of the present disclosure. Where like components in FIG. 2 are labeled identically to those in FIG. 1, it will be appreciated that description of those components detailed above with reference to FIG. 1 is equally applicable to FIG. 2. As shown, storage tank 102 may be used to mix or formulate the treatment fluid slurries of the present disclosure. Insulative base fluid may be introduced into storage tank 102 from fluid tank and tubular combination 104, and the ARAs may be introduced into storage tank 102 from fluid tank and tubular combination 106, or vice versa. As explained previously, the treatment fluid slurry need not be introduced into the storage tank 102 separately and need not be introduced using a fluid tank and tubular combination, without departing from the scope of the present disclosure.

The storage tank 102 is fluidically coupled to tank conveyance tubular 202, which may be substantially similarly to tank conveyance tubular 108 of FIG. 1. As depicted in FIG. 2, however, a sequence control assembly 204 is coupled between the tank conveyance tubular 202 and a diluting conveyance tubular 208. The diluting conveyance tubular is fluidically coupled to a diluting fluid tank 210. The diluting fluid tank 210 comprises a diluting base fluid and any supplemental material for diluting the treatment fluid slurry prior to introducing it to a downhole location (FIG. 3). Additionally, in some embodiments, the diluting fluid tank 210 may simply comprise a treatment fluid (e.g., a fracturing fluid) that is not used to dilute the treatment fluid slurry, but that can be alternatingly introduced into a subterranean formation with the treatment fluid slurry by use of the sequence control assembly 204, described below.

The sequence control assembly 204 comprises a first sequence valve 212 that is fluidically coupled to the diluting conveyance tubular 208 and the tank conveyance tubular 202. The first sequence valve 212 has an open position and a closed position. In the open position, the first sequence valve 212 permits fluid flow from the diluting conveyance tubular 208 and into the tank conveyance tubular 202. Accordingly, diluting base fluid in the diluting tank 210 can flow into the diluting conveyance tubular 208, passed the first sequence valve 212, and into the tank conveyance tubular 202. In the closed position, the first sequence valve 212 blocks flow from the diluting conveyance tubular 208 and prevents it from entering the tank conveyance tubular 202.

The sequence control assembly 204 further includes a second sequence valve 214 fluidically coupled to the tank conveyance tubular 202. Similar to the first sequence valve 212, the second sequence valve 214 has an open position and a closed position. In the open position, the second sequence valve 214 permits flow from the storage tank 102 and into the tank conveyance tubular 202. In the closed position, the second sequence valve 214 blocks flow from the storage tank 102 and into the tank conveyance tubular 202.

The sequence control assembly 204 further includes a sequence control connection 206 linking the first sequence valve 212 and the second sequence valve 214. The sequence control connection 206 is used to switch one or both of the first sequence valve 212 and/or the second sequence valve 214, either sequentially or simultaneously, to their open or closed position. The sequence control connection 206 may be controlled by an operator at a remote location or at the wellsite and can be used to switch the first sequence valve 212 and/or the second sequence valve 214 to their open and/or closed position at desired times or at multiple times during the duration of a particular subterranean formation operation (e.g., a diverting operation). Without limitation, the sequence control connection 206 may be an electrical connection, a hydraulic connection, or otherwise computer controlled, without departing from the scope of the present disclosure.

The sequence control assembly 204 can be used to modulate whether the treatment fluid slurry is diluted and, if so, but how much, prior to introduction of the treatment fluid slurry or diluted treatment fluid slurry into a subterranean formation (FIG. 3). Accordingly, in some instances, the first sequence valve 212 is in its open position and the second sequence valve 214 is in its open position to permit dilution of the treatment fluid slurry. In other embodiments, dilution is not desired, or the fluid in the diluting fluid tank 210 is not a diluting fluid, but another type of treatment fluid that is not intended to be mixed with the treatment fluid slurry in the tank conveyance tubular 202. In such cases, the valves alternate such that at certain times, the first sequence valve 212 is in its closed position and the second sequence valve 214 is in its open position and at other times, the first sequence valve 212 is in its open position and the second sequence valve 214 is in its closed position. Such alternating valve positions may be repeated multiple times throughout a particular subterranean formation operations, such as to treat multiple zones of the formation during the operation. Accordingly, the valves 212, 214 can provide for a seamless transition from fluid in the diluting fluid tank 210 and the treatment fluid slurry in the storage tank 102, and vice versa where applicable. As an example, when switching from the treatment fluid slurry in the storage tank 102 to the fluid in diluting fluid tank 210, the first sequence valve 212 must open before the second sequence valve 214 closes, and when switching back to the treatment fluid slurry in the storage tank 102, the second sequence valve 214 must open before the first sequence valve 212 closes. Each of these open and closed positions is controlled by the sequence control connection 206.

Similar to FIG. 1, and as depicted in FIG. 2, system 2 may further comprise any, all, or some of load cell(s) 112, flowmeter 116, and pump(s) 110.

Referring now to FIG. 3, illustrative is a schematic of a system that can deliver the treatment fluid slurries of the present disclosure to a downhole location, according to one or more embodiments. It should be noted that while FIG. 3 generally depicts a land-based system, it is to be recognized that like systems may be operated in subsea locations as well. As depicted in FIG. 3, system 3 may include storage tank 302, which may be substantially similar or the same as storage tank 102 of FIGS. 1 and 2, in which a treatment fluid slurry of the present disclosure may be mixed and formulated. The treatment fluid slurry may be conveyed via tank conveyance tubular 304, which may be substantially similar or the same as tank conveyance tubular 108 of FIGS. 1 and 2, to wellhead 306, where it enters wellbore tubular 308. The wellbore tubular 308 extends from wellhead 306 into subterranean formation 310. Upon being ejected from wellbore tubular 308, the treatment fluid slurry may subsequently penetrate into subterranean formation 310. In some instances, wellbore tubular 308 may have a plurality of orifices (not shown) through which the treatment fluid slurries of the present disclosure may enter the wellbore proximal to a portion of the subterranean formation 310 to be treated. In some instances, the wellbore may further comprise equipment or tools (not shown) for zonal isolation of a portion of the subterranean formation 310 to be treated.

Pump 312, which may be substantially similar or the same as pump 110 of FIGS. 1 and 2, may be configured to raise the pressure of the fluids to a desired degree before their introduction into tubular 16. It is to be recognized that system 1 is merely exemplary in nature and various additional components may be present that have not necessarily been depicted in the figures herein in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 3, the treatment fluid slurries of the present disclosure may, in some embodiments, flow back to wellhead 306 and exit subterranean formation 310. In some embodiments, the treatment fluid slurries that have flowed back to wellhead 306 may subsequently be recovered and recirculated to subterranean formation 310 or recycled and used in subsequent subterranean formation operations or non-oil and gas industry operations.

It is also to be recognized that the disclosed treatment fluid slurries may also directly or indirectly affect the various downhole equipment and tools that may come into contact with the treatment fluid slurries during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIGS. 1, 2, and 3.

The treatment fluid slurries of the present disclosure comprise an insulative base fluid that is an aqueous base fluid, an aqueous-miscible base fluid, and any combination thereof. Suitable aqueous base fluids for use in the treatment fluid slurries described herein may include, but are not limited to, fresh water, tap water, saltwater (e.g., water containing one or more salts dissolved therein), brine (e.g., saturated salt water), seawater, produced water (e.g., water produced as a byproduct from a subterranean formation during hydrocarbon production), waste water (e.g., water that has been adversely affected in quality by anthropogenic influence) that is untreated or treated, and any combination thereof. Generally, the water may be from any source, provided that it does not contain components that might adversely affect the stability and/or performance of the treatment fluid slurries (e.g., the insulative quality of the insulative base fluid, the stability of the ARAs, and the like). Suitable aqueous-miscible fluids may, include, but not be limited to, an alcohol (e.g., methanol, ethanol, n-propanol, isopropanol, n-butanol, sec-butanol, isobutanol, and t-butanol), a glycerin, a glycol (e.g., polyglycols, propylene glycol, and ethylene glycol), a polyglycol amine, a polyol, any derivative thereof, any in combination with a salt (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous base fluid described above, and any combination thereof.

The diluting base fluid that may be used to dilute the treatment fluid slurries described herein (e.g., included in the diluting storage tank 210 of FIG. 2) may be any of the insulative base fluids described above. Alternatively, the diluting base fluids may be non-insulative base fluids as the ARA no longer requires temperature stability to prevent reaction because the ARAs are being introduced into the subterranean formation. Accordingly, aside from the insulative base fluids, the diluting base fluid may additionally be an oil base fluid, an oil-in-water emulsion, a water-in-oil emulsion, and any combination thereof. Suitable oil base fluids may include, but are not limited to, alkanes, olefins, aromatic organic compounds, cyclic alkanes, paraffins, diesel fluids, mineral oils, desulfurized hydrogenated kerosenes, and any combination thereof. Suitable water-in-oil emulsions, also known as invert emulsions, may have an oil-to-water ratio from a lower limit of greater than 50:50, 55:45, 60:40, 65:35, 70:30, 75:25, or 80:20 to an upper limit of less than 100:0, 95:5, 90:10, 85:15, 80:20, 75:25, 70:30, or 65:35 by volume in the base fluid, encompassing any value and subset therebetween. Suitable oil-in-water emulsions may have a water-to-oil ratio from a lower limit of greater than 50:50, 55:45, 60:40, 65:35, 70:30, 75:25, or 80:20 to an upper limit of less than 100:0, 95:5, 90:10, 85:15, 80:20, 75:25, 70:30, or 65:35 by volume in the base fluid, encompassing any value and subset therebetween. It should be noted that for water-in-oil and oil-in-water emulsions, any mixture of the above may be used including the water being and/or comprising any aqueous base fluid or aqueous-miscible fluid described herein.

The ARAs of the present disclosure may be any subterranean formation additive that is reactive at a particular temperature encountered at one or more well-sites. For example, the ARAs may include, but are not limited to, a solid diverting agent, a tackifying agent, a consolidating agent, a lubricating agent, a fluid loss additive, a gelling agent, an emulsifier, a tracer, a polymer breaker, a surfactant, a coated propping agent (i.e., the coating about the proppant is reactive at a particular temperature), and any combination thereof. As used herein, the term "tackifying agent" refers to a substance that is capable of transforming into a sticky compound upon being activated (e.g., by encountering a temperature to trigger reaction). The term "consolidating agent" refers to a substance that is capable of forming a hardened coating on a surface (e.g., a solid particulate, a subterranean formation, and the like). A "lubricating agent," as used herein, refers to a substance capable of lowering torque and/or drag frictional forces within a wellbore or with wellbore equipment (e.g., drill bits). As used herein, the term "fluid loss additive" refers to a substance that lowers the volume of filtrate that passes through a filter medium. A "gelling agent," as used herein, refers to a substance that increases the viscosity or gel strength of a fluid. An "emulsifier," as used herein, refers to a substance that creates an emulsion (a dispersion of one immiscible liquid into another) by reducing interfacial tension between the emulsion liquids. As used herein, the term "tracer" refers to a substance that is detectable in a wellbore to infer information about the wellbore, the formation, or treatment fluids within the wellbore. As used herein, the term "polymer breaker" refers to a substance that reduces the viscosity of a treatment fluid by breaking long-chain polymers into shorter segments. A "surfactant," as used herein, refers to a substance that adsorbs at an interface, lowering the surface tension or interfacial tension between fluids or between a fluid and a solid.

The ARAs described herein may be reactive at cold ambient temperatures (cold ARAs) or hot ambient temperatures (hot ARAs). As used herein, the term "cold ambient temperature" refers to a temperature in the range of −45° C. to 0° C., encompassing any value and subset therebetween. For example, the cold ambient temperature may be from −45° C. to −36° C., or −36° C. to −27° C., or −27° C. to −18° C., or −18° C. to −9° C., or −9° C. to 0° C., or −36° C. to −9° C., or −27° C. to −18° C., encompassing any value and subset therebetween. As used herein, the term "hot ambient temperature" refers to a temperature in the range of 30° C. to 60° C., encompassing any value and subset therebetween. For example, the hot ambient temperature may be from 30° C. to 35° C., or 31° C. to 37° C., or 37° C. to 43° C., or 43° C. to 49° C., or 49° C. to 55° C., or 30° C. to 50° C., or 35° C. to 45° C., encompassing any value and subset therebetween.

In some instances, a particular ARA may be reactive at both cold ambient temperatures and hot ambient temperatures (e.g., where the ARA is unreactive at a temperature therebetween). In other embodiments, certain ARAs of a particular type (e.g., a diverting agent) may be reactive at cold ambient temperatures whereas other ARAs of the same type, but composed of a different chemical substance, may be reactive at hot ambient temperatures without departing from the scope of the present disclosure. Typically, the majority of ARAs are reactive at hot ambient temperatures (e.g., temperature encountered in typical downhole environments). ARAs that are reactive at cold ambient temperatures, without limitation, can be reactive by slowing desired reaction time, for example, to a point that it is detrimental to the operation being performed or the effectiveness of the ARA.

As an example of a treatment fluid slurry comprising an aqueous base fluid of tap water and a hot ARA diverting agent, the temperature of the aqueous base fluid (and thus the treatment fluid slurry) may be determined based on the ambient temperature at a particular well-site where the treatment fluid slurry is mixed, stored, and transferred for introduction into a formation, such as by one of the embodiment systems described herein. Tap water temperatures are typically cool enough to maintain the hot ARA diverting agent at a temperature below its reactive temperature. For example, if the storage tank 102 (FIGS. 1 and 2) is a 30 barrel tank (1 barrel=42 gallons) comprising the treatment fluid slurry at an initial temperature of −1.1° C. (70° F.), it is estimated that it would take up to about 14 hours to reach a hot ambient temperature of about 48.8° C. (120° F.). Insulating the storage tank 102 (FIGS. 1 and 2) could increase this time up to about 10-fold. Additionally, chilling the treatment fluid slurry could further extend the time. In some embodiments, the ratio of the ARA to the insulative base fluid is in the range of about 1:30 to about 3:1, encompassing any value and subset therebetween. For example, the ratio of the ARA to the insulative base fluid may be about 1:30 to about 1:25, or about 1:25 to about 1:20, or about 1:20 to about 1:15, or about 1:15 to about 1:10, or about 1:10 to about 1:5, or about 1:5 to about 1:1, or about 1:1 to about 1.5:1, or about 1.5:1 to about 2:1, or about 2:1 to about 2.5:1, or about 2.5:1 to about 3:1 by weight of the ARA to volume of the insulative base fluid when the ARA is a solid or a mixture of a solid and liquid, or by volume of the ARA to volume of the insulative base fluid when the ARA is a liquid, encompassing any value and every value therebetween. Each of these values is critical to the embodiments of the present disclosure and depend on a number of factors including, but not limited to, the mass of the ARA, the density of the ARA, the ARA type, the insulative base fluid type, and the like, and any combination thereof.

In some embodiments, prior to introducing the treatment fluid slurry into a subterranean formation, one or more supplemental additives may be included in the treatment fluid slurry for performing a particular downhole operation. The supplemental materials may be included into the storage tank 102 (FIGS. 1 and 2) or the diluting fluid tank 210 (FIG. 2), or through any one of the conveyance tubulars depicted in FIGS. 1 and 2 (i.e., tubulars 104, 106, 108, 202, 206, 208), without departing from the scope of the present disclosure. Examples of suitable supplemental materials include, but are not limited to, a salt, a weighting agent, an inert solid, a dispersion aid, a corrosion inhibitor, an emulsion thinner, an emulsion thickener, a particulate, a lost circulation material, a foaming agent, a gas, a pH control additive, a biocide, a crosslinker, a stabilizer, a chelating agent, a scale inhibitor, a gas hydrate inhibitor, a mutual solvent, an oxidizer, a reducer, a friction reducer, a clay stabilizing agent, and any combination thereof.

Embodiments disclosed herein include:

Embodiment A

A method comprising: mixing a treatment fluid slurry in a storage tank, the treatment fluid slurry comprising an insulative base fluid, an ambient-reactive subterranean formation additive (ARA), wherein the ARA reacts at an ambient temperature, the reaction resulting in surface modification of the ARA, degradation of the ARA, or a combination of surface modification and degradation of the ARA, and wherein the insulative base fluid maintains the treatment fluid slurry at a temperature different from the ambient temperature to prevent the ARA from reacting; and introducing the treatment fluid slurry into a subterranean formation.

Embodiment A may have one or more of the following additional elements in any combination:

Element A1: Wherein the surface modification of the ARA upon reaction at the ambient temperature causes the ARA to become adhesive, cohesive, or a combination of adhesive and cohesive.

Element A2: Wherein the insulative base fluid is selected from the group consisting of an aqueous base fluid, an aqueous-miscible base fluid, and any combination thereof.

Element A3: Wherein the ARA is selected from the group consisting of a solid diverting agent, a tackifying agent, a consolidating agent, a lubricating agent, a fluid loss additive, a gelling agent, an emulsifier, a tracer, a polymer breaker, a surfactant, a propping agent, and any combination thereof.

Element A4: Wherein the ambient temperature is a cold ambient temperature in the range of from −45° C. to 0° C.

Element A5: Wherein the ambient temperature is a hot ambient temperature in the range of from 3020 C. to 60° C.

Element A6: Wherein the treatment fluid slurry is introduced into the subterranean formation as a pill or a slug.

Element A7: Further comprising diluting the treatment fluid slurry prior to introducing it into the subterranean formation.

Element A8: Further comprising diluting the treatment fluid slurry continuously as it is introduced into the subterranean formation.

Element A9: Further comprising insulating the storage tank.

Element A10: Further comprising altering the temperature of the treatment fluid slurry in the storage tank by heating the treatment fluid slurry above the ambient temperature or cooling the treatment fluid slurry below the ambient temperature.

By way of non-limiting example, exemplary combinations applicable to A include: A1-A10; A2, A6, and A10; A3, A4, A5, and A8; A9 and A10; A3, A7, and A8; A1, A4, A5, and A9; A2 and A8; and the like.

Embodiment B

A system comprising: a storage tank comprising a treatment fluid slurry, the treatment fluid slurry comprising an insulative base fluid, an ambient-reactive subterranean formation additive (ARA), wherein the ARA reacts at an ambient temperature, the reaction resulting in surface modification of the ARA, degradation of the ARA, or a combination of surface modification and degradation of the ARA, and wherein the insulative base fluid maintains the treatment fluid slurry at a temperature different from the ambient temperature to prevent the ARA from reacting; a tank conveyance tubular fluidically coupling the storage tank and a pump; and a formation conveyance tubular fluidically coupling the pump to a downhole location in a subterranean formation.

Embodiment B may have one or more of the following additional elements in any combination:

Element B1: Further comprising a sequence control assembly including a first sequence valve fluidly coupling the diluting fluid conveyance and the tank conveyance tubular, a second sequence valve fluidly coupling the storage tank and the tank conveyance tubular, and a sequence control connection between the first sequence valve and the second sequence valve, wherein the first sequence valve has a closed position and an open position, wherein the closed position of the first sequence valve permits fluid flow from the diluting conveyance tubular and into the tank conveyance tubular, and the open position of the first sequence valve permits fluid flow from the storage tank and into the tank conveyance tubular; and wherein the second sequence valve has a closed position and an open position, wherein the closed position of the second sequence valve blocks fluid flow between the storage tank and the tank conveyance tubular, and the open position of the second sequence value permits fluid flow from the storage tank and into the tank conveyance tubular.

Element B2: Further comprising a sequence control assembly including a first sequence valve fluidly coupling the diluting fluid conveyance and the tank conveyance tubular, a second sequence valve fluidly coupling the storage tank and the tank conveyance tubular, and a sequence control connection between the first sequence valve and the second sequence valve, wherein the first sequence valve has a closed position and an open position, wherein the closed position of the first sequence valve permits fluid flow from the diluting conveyance tubular and into the tank conveyance tubular, and the open position of the first sequence valve permits fluid flow from the storage tank and into the tank conveyance tubular; and wherein the second sequence valve has a closed position and an open position, wherein the closed position of the second sequence valve blocks fluid flow between the storage tank and the tank conveyance tubular, and the open position of the second sequence value permits fluid flow from the storage tank and into the tank conveyance tubular, and wherein the first sequence valve is in the open position and the second sequence valve is in the closed position.

Element B3: Further comprising a sequence control assembly including a first sequence valve fluidly coupling the diluting fluid conveyance and the tank conveyance tubular, a second sequence valve fluidly coupling the storage tank and the tank conveyance tubular, and a sequence control connection between the first sequence valve and the second sequence valve, wherein the first sequence valve has a closed position and an open position, wherein the closed position of the first sequence valve permits fluid flow from the diluting conveyance tubular and into the tank conveyance tubular, and the open position of the first sequence valve permits fluid flow from the storage tank and into the tank conveyance tubular; and wherein the second sequence valve has a closed position and an open position, wherein the closed position of the second sequence valve blocks fluid flow between the storage tank and the tank conveyance tubular, and the open position of the second sequence value permits fluid flow from the storage tank and into the tank conveyance tubular, and wherein first sequence valve is in the closed position and the second sequence valve is in the open position.

Element B4: Further comprising a sequence control assembly including a first sequence valve fluidly coupling the diluting fluid conveyance and the tank conveyance tubular, a second sequence valve fluidly coupling the storage tank and the tank conveyance tubular, and a sequence control connection between the first sequence valve and the second sequence valve, wherein the first sequence valve has a closed position and an open position, wherein the closed position of the first sequence valve permits fluid flow from the diluting conveyance tubular and into the tank conveyance tubular, and the open position of the first sequence valve permits fluid flow from the storage tank and into the tank conveyance tubular; and wherein the second sequence valve has a closed position and an open position, wherein the closed position of the second sequence valve blocks fluid flow between the storage tank and the tank conveyance tubular, and the open position of the second sequence value permits fluid flow from the storage tank and into the tank conveyance tubular, and wherein the first sequence valve is in the open position and the second sequence valve is in the open position.

Element B5: Wherein the storage tank is insulated.

Element B6: Wherein the storage tank further includes a heating element for heating the treatment fluid slurry above the ambient temperature.

Element B7: Wherein the storage tank further includes a cooling element for cooling the treatment fluid slurry below the ambient temperature.

Element B8: Wherein the insulative base fluid is selected from the group consisting of an aqueous base fluid, an aqueous-miscible base fluid, and any combination thereof.

Element B9: Wherein the ARA is selected from the group consisting of a solid diverting agent, a tackifying agent, a consolidating agent, a lubricating agent, a fluid loss additive, a gelling agent, an emulsifier, a tracer, a polymer breaker, a surfactant, a propping agent, and any combination thereof.

By way of non-limiting example, exemplary combinations applicable to B include: B1, B2 and B5-B9; B1, B3, and B5-B9; B1 and B4-B9; B3 and B9; B1, B4, B5, and B8; B7 and B8; B1, B3, and B6; B5, B8, and B9; and the like.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method comprising:
   mixing a treatment fluid slurry in a storage tank, the treatment fluid slurry comprising an insulative base fluid, an ambient-reactive subterranean formation additive (ARA),
   wherein the ARA reacts at an ambient temperature, the reaction resulting in surface modification of the ARA, degradation of the ARA, or a combination of surface modification and degradation of the ARA, and
   wherein the insulative base fluid maintains the treatment fluid slurry at a temperature different from the ambient temperature to prevent the ARA from reacting; and
   introducing the treatment fluid slurry into a subterranean formation.

2. The method of claim 1, wherein the surface modification of the ARA upon reaction at the ambient temperature causes the ARA to become adhesive, cohesive, or a combination of adhesive and cohesive.

3. The method of claim 1, wherein the insulative base fluid is selected from the group consisting of an aqueous base fluid, an aqueous-miscible base fluid, and any combination thereof.

4. The method of claim 1, wherein the ARA is selected from the group consisting of a solid diverting agent, a tackifying agent, a consolidating agent, a lubricating agent, a fluid loss additive, a gelling agent, an emulsifier, a tracer, a polymer breaker, a surfactant, a propping agent, and any combination thereof.

5. The method of claim 1, wherein the ambient temperature is a cold ambient temperature in the range of from −45° C. to 0° C.

6. The method of claim 1, wherein the ambient temperature is a hot ambient temperature in the range of from 3020 C. to 60° C.

7. The method of claim 1, wherein the treatment fluid slurry is introduced into the subterranean formation as a pill or a slug.

8. The method of claim 1, further comprising diluting the treatment fluid slurry prior to introducing it into the subterranean formation.

9. The method of claim 1, further comprising diluting the treatment fluid slurry continuously as it is introduced into the subterranean formation.

10. The method of claim 1, further comprising insulating the storage tank.

11. The method of claim 1, further comprising altering the temperature of the treatment fluid slurry in the storage tank by heating the treatment fluid slurry above the ambient temperature or cooling the treatment fluid slurry below the ambient temperature.

12. A system comprising:
a storage tank comprising a treatment fluid slurry, the treatment fluid slurry comprising an insulative base fluid, an ambient-reactive subterranean formation additive (ARA),
wherein the ARA reacts at an ambient temperature, the reaction resulting in surface modification of the ARA, degradation of the ARA, or a combination of surface modification and degradation of the ARA, and
wherein the insulative base fluid maintains the treatment fluid slurry at a temperature different from the ambient temperature to prevent the ARA from reacting;
a tank conveyance tubular fluidically coupling the storage tank and a pump; and
a formation conveyance tubular fluidically coupling the pump to a downhole location in a subterranean formation.

13. The system of claim 12, further comprising a sequence control assembly including a first sequence valve fluidly coupling the diluting fluid conveyance and the tank conveyance tubular, a second sequence valve fluidly coupling the storage tank and the tank conveyance tubular, and a sequence control connection between the first sequence valve and the second sequence valve,
wherein the first sequence valve has a closed position and an open position, wherein the closed position of the first sequence valve permits fluid flow from the diluting conveyance tubular and into the tank conveyance tubular, and the open position of the first sequence valve permits fluid flow from the storage tank and into the tank conveyance tubular; and
wherein the second sequence valve has a closed position and an open position, wherein the closed position of the second sequence valve blocks fluid flow between the storage tank and the tank conveyance tubular, and the open position of the second sequence value permits fluid flow from the storage tank and into the tank conveyance tubular.

14. The system of claim 13, wherein the first sequence valve is in the open position and the second sequence valve is in the closed position.

15. The system of claim 13, wherein first sequence valve is in the closed position and the second sequence valve is in the open position.

16. The system of claim 13, wherein the first sequence valve is in the open position and the second sequence valve is in the open position.

17. The system of claim 12, wherein the storage tank is insulated.

18. The system of claim 12, wherein the storage tank further includes a heating element for heating the treatment fluid slurry above the ambient temperature.

19. The system of claim 12, wherein the storage tank further includes a cooling element for cooling the treatment fluid slurry below the ambient temperature.

20. The system of claim 12, wherein the ARA is selected from the group consisting of a solid diverting agent, a tackifying agent, a consolidating agent, a lubricating agent, a fluid loss additive, a gelling agent, an emulsifier, a tracer, a polymer breaker, a surfactant, a propping agent, and any combination thereof.

* * * * *

UNITED STATES PATENT AND TRADEMARK OFFICE
CERTIFICATE OF CORRECTION

PATENT NO. : 10,544,352 B2
APPLICATION NO. : 15/761071
DATED : January 28, 2020
INVENTOR(S) : Chad Adam Fisher Page 1 of 1

It is certified that error appears in the above-identified patent and that said Letters Patent is hereby corrected as shown below:

In the Specification

Column 13, Line 59:
Replace 3020°C.
With 30°C.

In the Claims

Column 17, Line 2:
Replace 3020°C.
With 30°C.

Signed and Sealed this
Thirty-first Day of March, 2020

Andrei Iancu
*Director of the United States Patent and Trademark Office*